(12) United States Patent
Liu et al.

(10) Patent No.: US 11,458,599 B2
(45) Date of Patent: Oct. 4, 2022

(54) QUICK CLAMPING DEVICE

(71) Applicant: SHENYANG INSTITUTE OF AUTOMATION, CHINESE ACADEMY OF SCIENCES, Liaoning (CN)

(72) Inventors: Jinguo Liu, Liaoning (CN); Keli Chen, Liaoning (CN); Haodong Chi, Liaoning (CN); Cao Tong, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 311 days.

(21) Appl. No.: 16/959,407

(22) PCT Filed: Dec. 20, 2018

(86) PCT No.: PCT/CN2018/122222
§ 371 (c)(1),
(2) Date: Jun. 30, 2020

(87) PCT Pub. No.: WO2019/128824
PCT Pub. Date: Jul. 4, 2019

(65) Prior Publication Data
US 2020/0331124 A1 Oct. 22, 2020

(30) Foreign Application Priority Data
Dec. 30, 2017 (CN) .......................... 201711487612.8

(51) Int. Cl.
*B25B 11/02* (2006.01)
*B23Q 3/12* (2006.01)
(52) U.S. Cl.
CPC ................ *B25B 11/02* (2013.01); *B23Q 3/12* (2013.01)

(58) Field of Classification Search
CPC .... B25B 5/02; B25B 5/04; B25B 5/10; B25B 5/14; B25B 11/00; B25B 11/02; B23Q 3/12
See application file for complete search history.

(56) References Cited

FOREIGN PATENT DOCUMENTS

| CN | 101722433 A | 6/2010 |
|---|---|---|
| CN | 203495636 U | 3/2014 |

(Continued)

*Primary Examiner* — Moshe Wilensky
(74) *Attorney, Agent, or Firm* — Novick, Kim & Lee, PLLC; Allen Xue

(57) ABSTRACT

The present invention relates to a quick clamping device. A pressing flange and a top plate are respectively installed on both sides of a bracket; one end of a top rod is rotatably connected with the top plate, and the other end is in threaded connection with a center pressing element; a slip ring copper sleeve is sleeved on the center pressing element; a synchronous slip ring can be sleeved outside the slip ring copper sleeve relatively movably; the outer end part of the slip ring copper sleeve is provided with a copper sleeve flange; a spring sleeved on the slip ring copper sleeve is arranged between the synchronous slip ring and the copper sleeve flange; both ends of the spring are respectively abutted against the synchronous slip ring and the copper sleeve flange; a plurality of pull rods are evenly distributed along the circumferential direction of a clamped element; one end of each of the pull rods is respectively hinged to the center pressing element, and the other end is a pressing end; the clamped element is positioned between the pressing flange and the pressing end of each pull rod; a connecting rod is connected between each of the pull rods and the synchronous slip ring; and both ends of the connecting rod are respectively hinged with the pull rods and the synchronous slip ring. The present invention has the advantages of novel structure, simple operation, small size, and the like.

9 Claims, 3 Drawing Sheets

(56) References Cited

FOREIGN PATENT DOCUMENTS

| | | |
|---|---|---|
| CN | 205271440 U | 6/2016 |
| CN | 108161793 A | 6/2018 |
| CN | 207757500 U | 8/2018 |
| DE | 102013005179 A1 | 9/2014 |

QUICK CLAMPING DEVICE

TECHNICAL FIELD

The present invention relates to a clamping device, particularly to a quick clamping device which can realize synchronous clamping of multiple surrounding points.

BACKGROUND

In recent years, with the rapid development of industrial automation, requirements for production efficiency are higher and higher. In order to satisfy the requirements of people for ease of operation during work and production, the quick clamping device gradually becomes a research hotspot in the field of automation in various countries due to its characteristics of simple operation, reliable clamping and high synchronization.

The existing clamping device generally realizes fixation of a clamped element through clamping elements on both sides and screws and nuts which are uniformly distributed along the circumference. The clamping manner is complicated in operation, is low in efficiency in occasions that need repeated disassembly and is poor in synchronization during loading.

SUMMARY

In view of the above problems in the existing clamping device, the purpose of the present invention is to provide a quick clamping device. The quick clamping device is suitable for occasions which need frequent clamping and release and have high requirements for ease and synchronization of pressing operation.

The purpose of the present invention is realized by the following technical solution:

The present invention comprises a bracket, a pressing flange, pull rods, a top plate, a connecting rod, a synchronous slip ring, a top rod, a copper sleeve flange and a center pressing element, wherein the pressing flange and the top plate are respectively installed on both sides of the bracket; one end of the top rod is rotatably connected with the top plate, and the other end is in threaded connection with the center pressing element; a slip ring copper sleeve is sleeved on the center pressing element; the synchronous slip ring can be sleeved outside the slip ring copper sleeve relatively movably; the outer end part of the slip ring copper sleeve is provided with the copper sleeve flange; a spring sleeved on the slip ring copper sleeve is arranged between the synchronous slip ring and the copper sleeve flange; both ends of the spring are respectively abutted against the synchronous slip ring and the copper sleeve flange; a plurality of pull rods are evenly distributed along the circumferential direction of a clamped element; one end of each of the pull rods is respectively hinged to the center pressing element, and the other end is a pressing end; the clamped element is positioned between the pressing flange and the pressing end of each pull rod; the connecting rod is connected between each of the pull rods and the synchronous slip ring; both ends of the connecting rod are respectively hinged with the pull rods and the synchronous slip ring; and reciprocating sliding of the synchronous slip ring drives each of the pull rods to synchronously press or release the clamped element.

A boss flange is arranged at one end of the top rod; the boss flange is installed on the top plate through a top rod end cover; the boss flange can rotate in the top rod end cover relative to the top plate; and a counterbore for facilitating the screwing of a wrench is formed at the other end of the top rod.

A trapezoidal external thread is made on the outer surface of the top rod; a central hole is provided on the center pressing element; and a trapezoidal internal thread cooperatively connected with the trapezoidal external thread is made on the inner wall of the central hole.

A cover plate is arranged on one side of the top plate; the cover plate is connected with the top plate through a guide shaft; one side of the center pressing element is located between the top plate and the cover plate; the guide shaft passes through the edge of the center pressing element; and a graphite copper sleeve is arranged between the guide shaft and the edge of the center pressing element.

The other side of the center pressing element is a boss; the slip ring copper sleeve is sleeved on the boss; the copper sleeve flange is connected with the end of the boss; and a hole through which the slip ring copper sleeve passes is formed in the cover plate.

The initial state of the spring is a compressed state; and the spring acts on the synchronous slip ring so that each of the pull rods generates a pre-tightening force of inward contraction in a free state.

A pressing end ring is arranged between the pressing end of each of the pull rods and the clamped element, and both sides of the clamped element are respectively cooperatively abutted against the pressing end cover and the pressing flange.

The top plate is made of high manganese steel.

The present invention has the advantages and positive effects that:

1. The present invention is provided with the synchronous slip ring, and the connecting rod can ensure that each of the pull rods has high synchronization during clamping and release.

2. During clamping and release, the present invention only needs to tighten and release the top rod through the wrench to clamp and release the clamped element, which is simple in operation and high in efficiency.

3. In the present invention, the top rod and the center pressing element are in trapezoidal thread fit to realize the clamping process. Because the trapezoidal thread has a self-locking function, the clamped thread is not easy to loose and has high reliability.

4. The present invention has novel structure, simple operation, small size, compact volume and space saving.

Wherein: 1 bracket fixing screw; 2 bracket; 3 top rod end cover fixing screw; 4 top rod end cover; 5 pressing end ring; 6 clamped element; 7 pressing flange; 8 pull rod; 9 top plate; 10 connecting rod and pull rod fixing screw; 11 pull rod fixing screw; 12 connecting rod; 13 connecting rod and slip ring fixing screw; 14 synchronous slip ring; 15 copper sleeve flange fixing screw; 16 top rod; 17 cover plate fixing screw; 18 cover plate; 19 copper sleeve flange; 20 guide shaft; 21 graphite copper sleeve; 22 center pressing element; 23 spring; 24 pressing flange fixing screw; 25 slip ring copper sleeve; 26 top plate fixing screw; and 27 boss flange.

DETAILED DESCRIPTION

The present invention is further detailed below in combination with the drawings.

Figure 1:
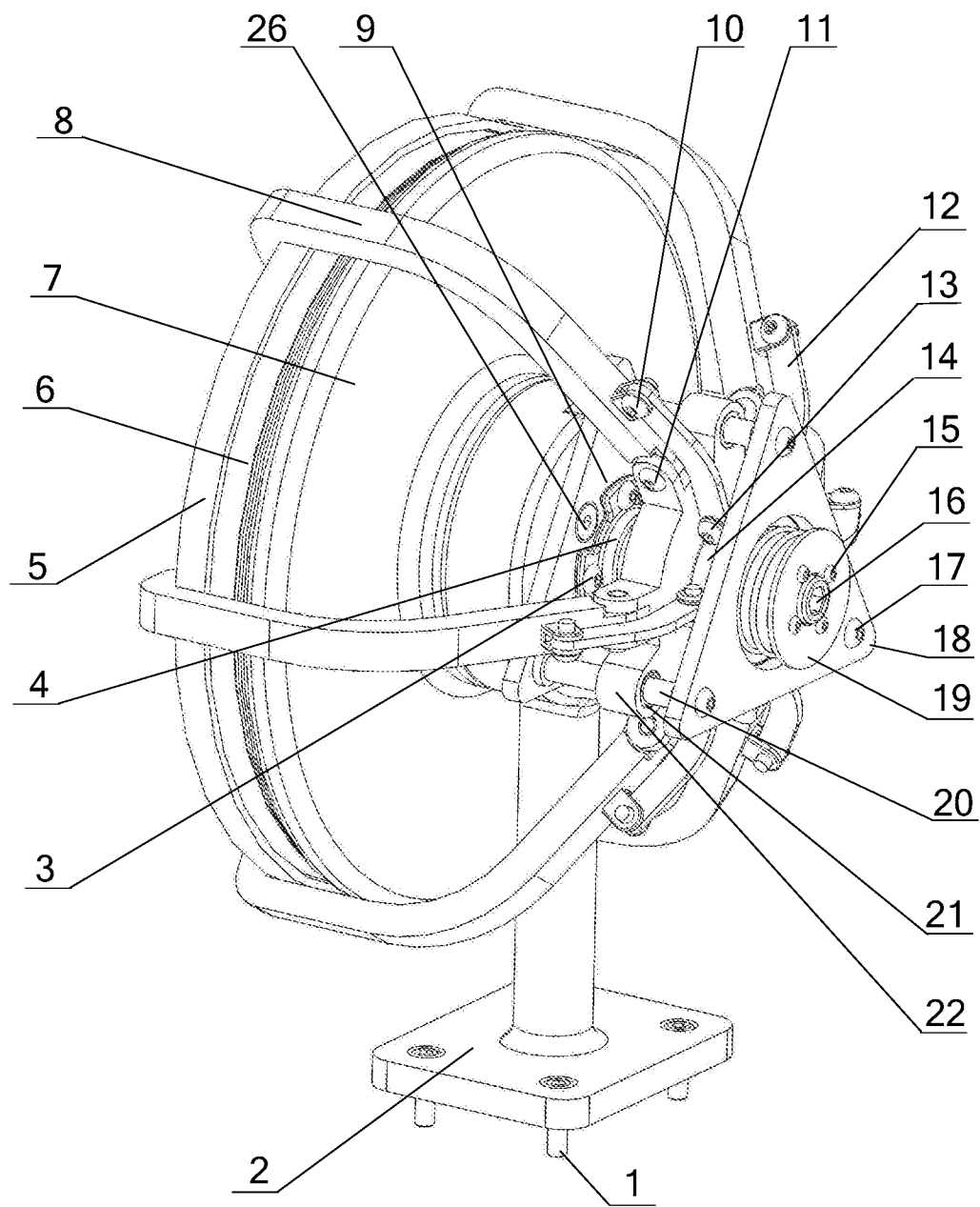
FIG. 1 is a structural schematic diagram of a pressing state of the present invention.
Figure 2:
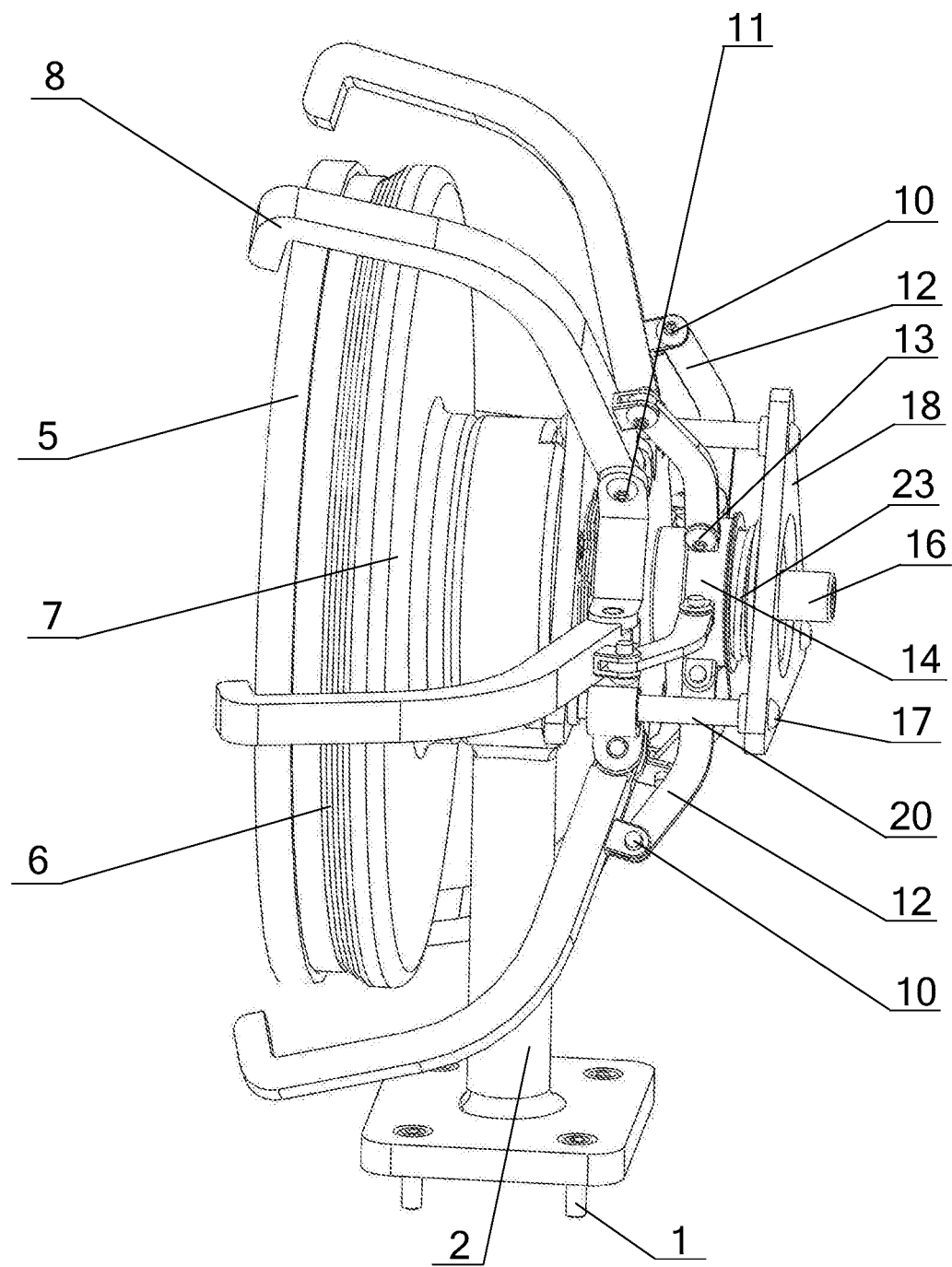
FIG. 2 is a structural schematic diagram of a release state of the present invention.
Figure 3:
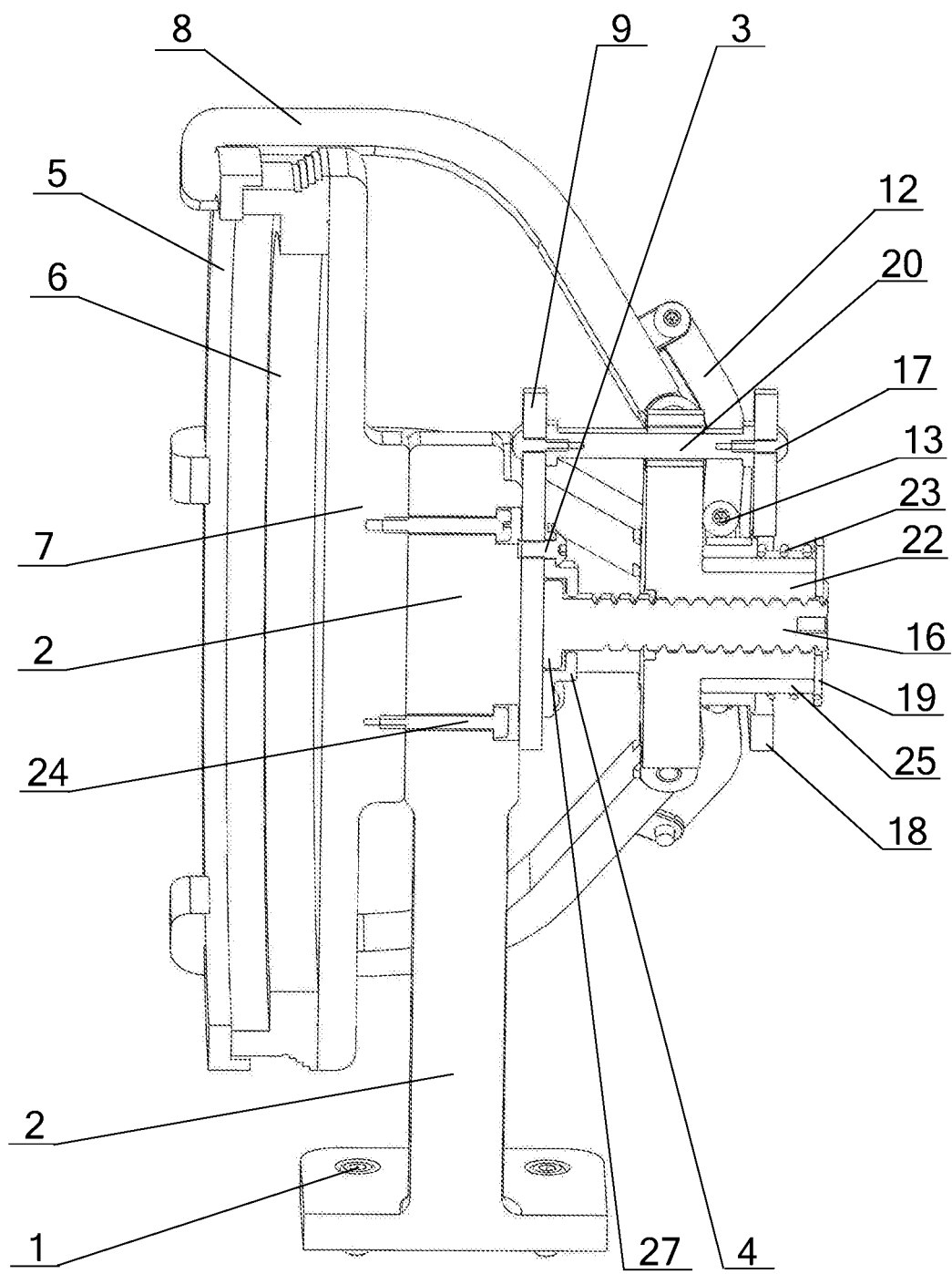
FIG. 3 is a structural sectional view of the present invention.

As shown in FIGS. 1-3, the present invention comprises a bracket 2, a top rod end cover 4, a pressing end ring 5, a pressing flange 7, pull rods 8, a top plate 9, a connecting rod 12, a synchronous slip ring 14, a top rod 16, a cover plate 18, a copper sleeve flange 19, guide shafts 20, graphite copper sleeves 21 and a center pressing element 22, wherein the pressing flange 7 and the top plate 9 are respectively installed on both sides of the upper part of the bracket 2 through a pressing flange fixing screw 24 and a top plate fixing screw 26; and a bracket fixing screw 1 for connection and installation is arranged on the lower part of the bracket 2.

One end of the top rod 16 is provided with a boss flange 27; the boss flange 27 is contained in the top rod end cover 4; the top rod end cover 4 is fixed to the top plate 9 through a top rod end cover fixing screw 3; One surface of the boss flange 27 facing the top plate 9 is matched with the top plate 9, and the boss flange 27 can rotate relative to the top plate 9 in the top end cover 4. A counterbore for facilitating the screwing of a wrench is formed at the other end of the top rod 16. The counterbore in the present embodiment is a hexagonal socket counterbore.

The cover plate 18 is arranged on one side of the top plate 9; the cover plate 18 is connected with the top plate 9 through a plurality of guide shafts 20; and the guide shafts 20, the top plate 9 and the cover plate 18 are fixedly connected together respectively through the cover plate fixing screw 17 on both ends of guide shafts 20. Three guide shafts 20 are arranged in the present embodiment. One side of the center pressing element 22 is located between the top plate 9 and the cover plate 18; three through holes are formed at the outer edge of one side of the center pressing element 22; three guide shafts 20 respectively pass through the three through holes; the graphite copper sleeve 21 is arranged in each of the through holes; the guide shafts 20 pass through the graphite copper sleeves 21; the inner walls of the through holes are matched with the outer sides of the graphite copper sleeves 21; and the inner sides of the graphite copper sleeves 21 can slide along the axial direction of the guide shafts 20. The other side of the center pressing element 22 is a boss; the slip ring copper sleeve 25 is sleeved on the boss; the outer side of the boss is matched with the inner side of the slip ring copper sleeve 25; the synchronous slip ring 14 can be sleeved outside the slip ring copper sleeve 25 relatively movably; the outer end part of the slip ring copper sleeve 25 is provided with the copper sleeve flange 19; and the ends of the copper sleeve flange 19 and the boss are fixed through a copper sleeve flange fixing screw 15. A spring 23 sleeved on the slip ring copper sleeve 25 is arranged between the synchronous slip ring 14 and the copper sleeve flange 19; both ends of the spring 23 are respectively abutted against the synchronous slip ring 14 and the copper sleeve flange 19; and the spring 23 is coaxially compressed between the synchronous slip ring 14 and the copper sleeve flange 19. A hole through which the slip ring copper sleeve 25 passes is formed in the cover plate 18.

The other end of the top rod 16 is in threaded connection with the center pressing element 22. A trapezoidal external thread is made on the outer surface of the top rod 16; a central hole is provided on the center pressing element 22; and a trapezoidal internal thread cooperatively connected with the trapezoidal external thread is made on the inner wall of the central hole. The top rod 16 is coaxially matched with the center pressing element 22.

A plurality of (six, in the present embodiment) pull rods 8 are evenly distributed along the circumferential direction of a clamped element 6; one end of each of the pull rods 8 is respectively hinged to the center pressing element 22 through a pull rod fixing screw 11, and the other end is a pressing end. A pressing end ring 5 is arranged between the pressing end of each of the pull rods 8 and the clamped element 6, and both sides of the clamped element 6 are respectively cooperatively abutted against the pressing end cover 5 and the pressing flange 7. The pressing end of each of the pull rods 8 is matched with the side surface of the pressing end cover 5. The connecting rod 12 is connected between each of the pull rods 8 and the synchronous slip ring 14; one end of the connecting rod 12 is hinged with the pull rod 8 by a connecting rod and pull rod fixing screw 10, and the other end is hinged with the synchronous slip ring 14 through a connecting rod and slip ring fixing screw 13. The initial state of the spring 23 is a compressed state; and the spring 23 acts on the synchronous slip ring 14 so that each of the pull rods 8 generates a pre-tightening force of inward contraction in a free state.

The top plate 9 of the present invention is made of high manganese steel with high hardness and good wear resistance.

The present invention has the operating principle that:

Taking a quick clamping process as an example, firstly, an operator drives a pull rod 8 to move outwards with hands, so that six pull claws 8 uniformly distributed along the circumference are synchronously opened under the action of the synchronous slip ring 14; the clamped element 6 is put between the pressing end ring 5 and the pressing flange 7; and subsequently, the pull rod 8 is released so that the six pull claws 8 are contracted inwards under the action of the spring 23. Then, a ratchet wrench is inserted into the hexagonal socket counterbore formed on the other end of the top rod 16; the ratchet wrench is used to drive the top rod 16 to rotate so that the center pressing element 22, the slip ring copper sleeve 25 and the copper sleeve flange 19 axially move; thus, each pull rod 8 clamps the clamped element 6 through the pressing end ring 5 and the pressing flange 7. A release process is reverse to the clamping operation process.

The invention claimed is:

1. A quick clamping device comprising: a bracket (2), a pressing flange (7), pull rods (8), a top plate (9), a connecting rod (12), a synchronous slip ring (14), a top rod (16), a copper sleeve flange (19) and a center pressing element (22), wherein the pressing flange (7) and the top plate (9) are respectively installed on both sides of the bracket (2); one end of the top rod (16) is rotatably connected with the top plate (9), and the other end is in threaded connection with the center pressing element (22); a slip ring copper sleeve (25) is sleeved on the center pressing element (22); the synchronous slip ring (14) can be sleeved outside the slip ring copper sleeve (25) relatively movably; the outer end part of the slip ring copper sleeve (25) is provided with the copper sleeve flange (19); a spring (23) sleeved on the slip ring copper sleeve (25) is arranged between the synchronous slip ring (14) and the copper sleeve flange (19); both ends of the spring (23) are respectively abutted against the synchronous slip ring (14) and the copper sleeve flange (19); a plurality of pull rods (8) are evenly distributed along the circumferential direction of a clamped element (6); one end of each of the pull rods (8) is respectively hinged to the center pressing element (22), and the other end is a pressing end; the clamped element (6) is positioned between the pressing flange (7) and the pressing end of each pull rod (8); the connecting rod (12) is connected between each of the pull rods (8) and the synchronous slip ring (14); both ends of the connecting rod (12) are respectively hinged with the pull rods (8) and the synchronous slip ring (14); and reciprocating sliding of the synchronous slip ring (14) drives each of the pull rods (8) to synchronously press or release the clamped element (6).

2. The quick clamping device according to claim 1, characterized in that a boss flange (27) is arranged at one end of the top rod (16); the boss flange (27) is installed on the top plate (9) through a top rod end cover (4); the boss flange (27) can rotate in the top rod end cover (4) relative to the top plate (9); and a counterbore for facilitating the screwing of a wrench is formed at the other end of the top rod (16).

3. The quick clamping device according to claim 1, characterized in that a trapezoidal external thread is made on the outer surface of the top rod (16); a central hole is provided on the center pressing element (22); and a trapezoidal internal thread cooperatively connected with the trapezoidal external thread is made on the inner wall of the central hole.

4. The quick clamping device according to claim 1, characterized in that a cover plate (18) is arranged on one side of the top plate (9); the cover plate (18) is connected with the top plate (9) through a guide shaft (20); one side of the center pressing element (22) is located between the top plate (9) and the cover plate (18); and the guide shaft (20) passes through the edge of the center pressing element (22).

5. The quick clamping device according to claim 4, characterized in that and a graphite copper sleeve (21) is arranged between the guide shaft (20) and the edge of the center pressing element (22).

6. The quick clamping device according to claim 4, characterized in that the other side of the center pressing element (22) is a boss; the slip ring copper sleeve (25) is sleeved on the boss; the copper sleeve flange (19) is connected with the end of the boss; a hole through which the slip ring copper sleeve (25) passes is formed in the cover plate (18).

7. The quick clamping device according to claim 1, characterized in that the initial state of the spring (23) is a compressed state; and the spring (23) acts on the synchronous slip ring (14) so that each of the pull rods (8) generates a pre-tightening force of inward contraction in a free state.

8. The quick clamping device according to claim 1, characterized in that a pressing end ring (5) is arranged between the pressing end of each of the pull rods (8) and the clamped element (6), and both sides of the clamped element (6) are respectively cooperatively abutted against the pressing end cover (5) and the pressing flange (7).

9. The quick clamping device according to claim 1, characterized in that the top plate is made of high manganese steel.

* * * * *